US009550675B2

(12) United States Patent
Vogler et al.

(10) Patent No.: US 9,550,675 B2
(45) Date of Patent: Jan. 24, 2017

(54) METHOD FOR REMOVING A PARTICULATE CONTAMINANT MATERIAL FROM A PARTICULATE MIXED LITHIUM METAL PHOSPHATE MATERIAL

(75) Inventors: Christian Vogler, Moosburg (DE); Peter Bauer, Buch am Erlbach (DE); Christophe Michot, Quebec (CA)

(73) Assignee: JOHNSON MATTHEY PLC, London (GB)

(*) Notice: Subject to any disclaimer, the term of this patent is extended or adjusted under 35 U.S.C. 154(b) by 1245 days.

(21) Appl. No.: 13/502,265

(22) PCT Filed: Oct. 13, 2010

(86) PCT No.: PCT/EP2010/006266
§ 371 (c)(1),
(2), (4) Date: Sep. 17, 2012

(87) PCT Pub. No.: WO2011/045049
PCT Pub. Date: Apr. 21, 2011

(65) Prior Publication Data
US 2013/0001335 A1    Jan. 3, 2013

(30) Foreign Application Priority Data
Oct. 15, 2009    (EP) .................................... 09013035

(51) Int. Cl.
*B02C 23/08* (2006.01)
*C01B 25/37* (2006.01)
*B07B 15/00* (2006.01)

(52) U.S. Cl.
CPC ............... *C01B 25/37* (2013.01); *B02C 23/08* (2013.01); *B07B 15/00* (2013.01)

(58) Field of Classification Search
CPC .......... B07B 15/00; B02C 23/08; C01B 25/37; C01G 45/1221; C01G 45/1228; C01G 45/1257; B01J 4/008
See application file for complete search history.

(56) References Cited

U.S. PATENT DOCUMENTS 2,200,472 A * 5/1940 Erdmann .................. B07B 4/08
                                                             209/27
3,685,964 A     8/1972 Treitler et al.
(Continued)

FOREIGN PATENT DOCUMENTS

EP         1 094 523 A2    4/2001
JP         2002-151082     5/2002
(Continued)

OTHER PUBLICATIONS

Franger et al., *Comparison between different LiFePO₄ synthesis routes and their influence on its physico-chemical properties*, Journal of Power Sources 119-121:252-257 (2003).
(Continued)

*Primary Examiner* — Joseph C Rodriguez
(74) *Attorney, Agent, or Firm* — Young & Thompson

(57) ABSTRACT

A method for removing a particulate contaminant material from a particulate mixed lithium metal phosphate material is provided. The method includes feeding the particulate mixed lithium metal phosphate material into a fluidizing stage containing particulate mixed lithium metal phosphate material of mass m, feeding the fluidized particulate mixed lithium metal phosphate material through a sifting stage, discontinuing the feed of the particulate mixed lithium metal phosphate material into the fluidizing stage after 10 to 100 times of the mass m have been fed into the fluidizing stage, fluidizing and sifting the material present in the fluidizing stage after discontinuing the feed until the mass of the
(Continued)

300 μm material present in the fluidizing stage becomes 10% to 100% of the mass m, and removing the remaining material from the fluidizing stage.

15 Claims, 2 Drawing Sheets

(56) References Cited

U.S. PATENT DOCUMENTS

| | | | | |
|---|---|---|---|---|
| 4,528,848 A * | 7/1985 | Hafner | ............... | G01F 11/24 110/101 CC |
| 4,652,362 A * | 3/1987 | Mueller | ............... | B03B 4/02 209/312 |
| 4,865,722 A * | 9/1989 | Ririe | ............... | A01D 33/08 209/474 |
| 4,973,458 A | 11/1990 | Newby et al. | | |
| 5,784,974 A * | 7/1998 | Krauss | ............... | F23N 5/184 110/101 C |
| 5,910,382 A | 6/1999 | Goodenough et al. | | |
| 6,253,465 B1 * | 7/2001 | Ichitani | ............... | B01J 8/36 209/139.1 |
| 6,467,707 B1 * | 10/2002 | Williams, Jr. | ............... | B02C 25/00 241/18 |
| 7,998,618 B2 * | 8/2011 | Nuspl | ............... | C01B 25/45 423/306 |
| 8,197,561 B2 * | 6/2012 | Dunlop | ............... | C10L 5/04 44/620 |
| 8,431,005 B1 * | 4/2013 | Zbranek | ............... | C01B 31/24 205/482 |
| 8,574,519 B2 * | 11/2013 | Harrison | ............... | C01B 35/063 423/186 |
| 2001/0028871 A1 * | 10/2001 | Harrison | ............... | C01D 15/08 423/421 |
| 2003/0124423 A1 | 7/2003 | Sasaki et al. | | |
| 2004/0151649 A1 | 8/2004 | Hemmer et al. | | |
| 2007/0054187 A1 | 3/2007 | Nuspl et al. | | |
| 2011/0052484 A1 * | 3/2011 | Krampitz | ............... | C01G 23/005 423/599 |
| 2011/0314728 A1 * | 12/2011 | Camper | ............... | C10L 5/04 44/606 |
| 2013/0001335 A1 * | 1/2013 | Vogler | ............... | C01B 25/37 241/20 |
| 2013/0156683 A1 * | 6/2013 | Holzapfel | ............... | C01B 25/37 423/594.15 |
| 2016/0013482 A1 * | 1/2016 | Frianeza-Kullberg | | H01M 4/525 429/231.1 |

FOREIGN PATENT DOCUMENTS

| | | |
|---|---|---|
| TW | 200523210 | 7/2005 |
| WO | WO 02/083555 A2 | 10/2002 |
| WO | WO 02/099913 A1 | 12/2002 |

OTHER PUBLICATIONS

Padhi et al., *Phospho-olivines as Positive-Electrode Materials for Rechargeable Lithium Batteries*, J Electrochem. Soc 144:1188-1194 (1997).

International Search Report PCT/EP2010/006266 dated Jan. 3, 2011.

* cited by examiner

100 µm

300 μm

METHOD FOR REMOVING A PARTICULATE CONTAMINANT MATERIAL FROM A PARTICULATE MIXED LITHIUM METAL PHOSPHATE MATERIAL

CROSS-REFERENCE TO RELATED APPLICATIONS

This application is a U.S. National Stage application claiming benefit of International Application No. PCT/EP2010/006266, filed Oct. 13, 2010, and claiming benefit of European Application No. EP 09 013 035.2, filed Oct. 15, 2009. The entire disclosures of both PCT/EP2010/006266 and EP 09 013 035.2 are incorporated herein by reference.

BACKGROUND

The present invention relates to a method for removing a particulate contaminant material from a particulate mixed lithium metal phosphate material.

The use of synthetic mixed lithium transition metal phosphates, especially lithium iron phosphate ($LiFePO_4$), as an alternative cathode material in lithium ion batteries is known from the prior art and is subject to numerous research efforts. This was described for the first time in A. K. Padhi, K. S. Nanjundaswamy, J. B. Goodenough, J. Electrochem. Soc. Vol. 144 (1997) and is also disclosed, for example, in U.S. Pat. No. 5,910,382.

A number of synthetic methods for obtaining doped and undoped lithium transition metal phosphates have been described so far.

WO 02/099913 A1 discloses a synthetic method, wherein the water is evaporated from an equimolar aqueous solution of $Li^{3O}$, $Fe^{3+}$ and $PO_4^{3-}$ to produce a solids mixture, after which the solids mixture is decomposed at a temperature below 500° C. in order to produce a pure mixed Li/Fe phosphate precursor. Phase pure $LiFePO_4$ powder is then obtained by reacting the precursor at a temperature of below 800° C. in a reducing atmosphere.

Also solid state processes are known from the prior art. Drawbacks include firstly the high material costs of the starting chemicals (e.g. iron oxalate). The consumption of protective gas during the sintering process is also considerable, and toxic by-products, such as CO, are formed during sintering. It has also been discovered that the particle size distribution of the product so obtained is often very wide and bimodal. Further production processes are known, for example, from WO 02/083555, EP 1 094 523 A1, US 2003/0124423 and Franger et al., Journal of Power Sources 119-121 (2003), pp. 252-257.

JP 2002-151082 A describes lithium iron phosphate, processes for producing it and a secondary battery which uses it. The process for producing lithium iron phosphate is characterized in that a lithium compound, a divalent iron compound and a phosphoric acid compound are mixed with one another in such a way that at least the molar ratio of the divalent iron ions and the phosphoric acid ions is approximately 1:1, and the mixture is made to react in a temperature range from at least 100° C. up to at most 200° C. in a tightly closed vessel with the addition of a polar solvent and an inactive gas. The lithium iron phosphate obtained in this way can then be physically comminuted.

Although usable lithium iron phosphate can already be obtained using the processes according to the prior art, said production processes nevertheless have the drawback that it is not possible to obtain pulverulent lithium iron phosphate with a very small particle size and a very narrow particle size distribution.

A process for producing mixed lithium metal phosphates, like for example lithium iron phosphate, avoiding said drawbacks of the prior art and in particular providing a material which is especially suitable for electrodes of rechargeable batteries is described in US 2007/0054187 A1.

The process according to US 2007/0054187 A1 is carried out by producing a precursor mixture containing at least one $Li^+$ source, at least one $M^{2+}$ source and at least one $PO_4^{3-}$ source, wherein M comprises at least one metal from the first transition series, in order to form a precipitate and thereby to produce a precursor suspension, dispersing or milling the precursor mixture or suspension until the $D_{90}$ value of particles in a precipitate of the precursor mixture or suspension is less than 50 μm, and obtaining $LiMPO_4$ from the precursor mixture or suspension by reaction under hydrothermal conditions.

The $LiMPO_4$ products obtained according to US 2007/0054187 A1 have satisfactory properties for using them as electrode materials of rechargeable batteries.

However, when using the $LiMPO_4$ products obtained according to US 2007/0054187 A1 in practice it has been noted that lithium ion cells produced with said $LiMPO_4$ products sometimes suffer from an increased self discharge and failure rate. When analyzing the $LiMPO_4$ products used for said lithium ion cells it was found that they included particulate contaminations, in particular metallic and/or oxidic (oxide) particulate contaminations, like for example Fe and Fe oxides in case of $LiFePO_4$, having an average particle size which is above that of said $LiMPO_4$ products. The amount of said particulate contaminations was in a range of 1 ppm to 10 ppm, based on the $LiMPO_4$ product.

In order to lower or preferably exclude the occurrence of an increased self discharge and failure rate of lithium ion cells produced with said $LiMPO_4$ products, there is a need to provide a simple but effective method for removing said particulate contaminations from said $LiMPO_4$ products.

According to a conventional technique for removing particulate contaminations from particulate material, wherein the particulate contaminations have a larger particle size than that of the particulate material, the contaminated particulate material in a fluidized bed is continuously passed through a sifting device, like for example a cyclone or a sifting wheel. According to this technique, the finer particles of the particulate material are separated from coarse particles of the particulate contaminations, which are rejected into the fluidized bed. In case the contaminated particulate material is milled before it is fluidized/sifted, it is also known that hard-to-mill particulate contaminations like metal particles do not pass the sifter as easily as the main product as they stay bigger and can therefore be more or less accumulated in the fluidized bed.

When the above-discussed conventional technique was applied for removing a particulate contaminant material from a particulate mixed lithium metal phosphate material it turned out that the conventional technique was not effective enough in removing a large quantity, preferably essentially all particulate contaminant material from a particulate mixed lithium metal phosphate material.

SUMMARY

Therefore, the problem underlying the present invention was to provide a further method for removing a particulate contaminant material from a particulate mixed lithium metal phosphate material.

The problem is solved by a method for removing a particulate contaminant material from a particulate mixed lithium metal phosphate material, comprising the steps of a) providing a particulate mixed lithium metal phosphate material, including a particulate contaminant material and a fine particulate mixed lithium metal phosphate, having the mass x*m, wherein x≥100, b) feeding the particulate mixed lithium metal phosphate material into a fluidizing stage and fluidizing it in the fluidizing stage, c) feeding the fluidized particulate mixed lithium metal phosphate material to a sifting stage and passing it through the sifting stage, d) discontinuing the feed of the particulate mixed lithium metal phosphate material into the fluidizing stage after 10 to 100 times of the mass m have been fed into the fluidizing stage, e) fluidizing and sifting the material present in the fluidizing stage after discontinuing the feed, until the mass of the material present in the fluidizing stage becomes 10% to 100% of the mass m, and f) removing the remaining material from the fluidizing stage, wherein the sequence of steps b) to f) is repeated until the total mass x*m has been processed.

m means in the context of the present invention the filling level (the average mass of the material) of the fluidized bed chamber used in the fluidizing stage. If several fluidized bed chambers are used, then m means the filling level of all fluidized bed chambers.

Surprisingly it has been found that according to the present method it is possible to remove a particulate contaminant material from a particulate mixed lithium metal phosphate material such that the amount of particulate contaminant material remaining in the particulate mixed lithium metal phosphate material is less than 1 ppm of the particulate mixed lithium metal phosphate material, preferably less than 0.1 ppm, more preferably less than 0.02 ppm.

DETAILED DESCRIPTION

According to a preferred embodiment of the present method, the feed of the particulate mixed lithium metal phosphate material into the fluidizing stage is discontinued after 20 to 85 times, preferably after 30 to 70 times, in particular after 40 to 60 times of the mass m have been fed into the fluidizing stage.

According to a preferred embodiment of the present method, the material present in the fluidizing stage is fluidized and sifted after discontinuing the feed, until the mass of the material present in the fluidizing stage becomes 20% to 80%, preferably 30% to 70% and in particular 40% to 60% of the mass m. The fluidizing stage is preferably carried out in at least one fluidized bed chambers in further embodiments of the invention, several, i.e. two or more of such fluidized bed chambers can be used.

The particulate mixed lithium metal phosphate material comprises a fine particulate mixed lithium metal phosphate and a particulate contaminant material.

According to a further preferred embodiment of the present method, the mixed lithium metal phosphate is represented by the formula $LiMPO_4$, wherein M is selected from at least one metal selected from the group consisting of Fe, Sc, Ti, V, Cr, Mn, Co, Ni, Cu, Zn, Be, Mg, Ca, Sr, Ba, Al, Zr, La and rare earth metals and combinations thereof.

It is also possible for M to represent two or more transition metals in the compound $LiMPO_4$. For example, the iron in $LiFePO_4$ may be partially replaced by one or more other metals selected from the above group, like Mn, Co, Ni, Mg, Nb, Ta, Sc, Zr, Zn, and rare earth metals.

Therefore, according to a further preferred embodiment of the present method M is selected from Fe, Mn, Co and/or Ni.

According to a further preferred embodiment of the present method M is Fe, i.e. the mixed lithium metal phosphate is $LiFePO_4$.

According to a further preferred embodiment of the present method M is Fe and the further transition metal is Mg or Nb, i.e. the mixed lithium metal phosphate is $LiFe_{1-x}Mg_xPO_4$ or $LiFe_{1-x}Nb_xPO_4$, wherein x≤0.5.

According to a still further preferred embodiment of the present method the fine particulate mixed lithium metal phosphate consists of particles having a $D_{90}$ value of at most 25 μm, more preferably of at most 20 μm, particularly preferable of at most 15 μm.

The mean (average) particle size ($D_{50}$) value of said particles is preferably less than 0.8 μm, more preferably less than 0.7 μm, in particular less than 0.6 μm, most preferably less than 0.5 μm. The particle size distribution is preferably at least substantially a normal distribution (monomodal).

It is further preferred that the DA value of said particles is less than 0.35 μm, preferably less than 0.40 μm, but may also be higher with narrow particle size distributions, depending on the $D_{90}$ value. The $D_{90}$ value is preferably less than 3.0 μm, preferably less than 2.5 μm, in particular less than 2.0 μm.

The particle size distribution of the fine particulate mixed lithium metal phosphate is preferably very narrow. Accordingly, the difference between the $D_{90}$ value and the $D_{10}$ value is preferably no more than 2 μm, preferably no more than 1.5 μm, in particular no more than 1 μm, most preferably no more than 0.5 μm.

The particle size distribution of the $LiMPO_4$ used in the present method is determined with light-scattering using commercially available equipment. The person skilled in the art will be familiar with this method, and in this context reference is also made to the disclosure given in JP 2002-151082 and WO 02/083555. In the present case, the particle size distributions were determined by a laser diffraction measuring appliance (Mastersizer S, Malvern Instruments GmbH, Herrenberg, Del.) and the manufacturer's software (Version 2.19) with a Malvern Small Volume Sample Dispersion Unit, DIF 2002, as measurement unit. The following measurement conditions were selected: Compressed range; active beam length 2.4 mm; measurement range: 300 RF; 0.05 to 900 μm. The specimen preparation and measurement were carried out in accordance with the manufacturer's instructions.

The $D_{90}$ value indicates the value at which 90% of the particles in the measured sample have a particle diameter which is smaller than or equal to this value. Accordingly, the $D_{50}$ value and the $D_{10}$ value indicate the values at which 50% and 10% of the particles in the measured sample have a particle diameter smaller than or equal to these values.

According to a further preferred embodiment of the present method the particulate contaminant material is a metallic material and/or a metal oxide material. The kind of the metallic material and/or metal oxide material forming the particulate contaminant material depends on the specific fine particulate mixed lithium metal phosphate used. For example, in case of $LiFePO_4$ the particulate contaminant material will include metallic Fe particles and/or iron oxides, like $Fe_3O_4$, $Fe_2O_3$ etc.

The average particle size of the particulate contaminant material is larger than the average particle size of the fine particulate mixed lithium metal phosphate. In particular, the average particle size of the particulate contaminant material is at least 50 μm, preferably at least 60 μm, in particular at least 70 μm.

According to a further preferred embodiment of the present method the fluidizing stage is a fluidized bed chamber. The skilled person is aware of fluidized bed chamber designs suitable for fluidizing the above-described contaminated fine particulate mixed lithium metal phosphate. The fluidization can be achieved either by air or any other usual fluidizing gas, which is for example injected by nozzles or by a distribution plate, or by mechanical impact, for example by a rotor system.

Furthermore, as the sifting stage any device suitable for classifying particles according to their size and/or density can be used. Suitable devices for the sifting stage are therefore classifier wheels, an airstream sifter and cyclones.

According to a further preferred embodiment of the present method the method additionally comprises a step b1) of milling the particulate mixed lithium metal phosphate material in a milling stage between the steps a) and b) or between the steps b) and c).

The milling step serves to deagglomerate the particles of the particulate mixed lithium metal phosphate material in order to facilitate removal of the particulate contaminant materials from the fine particulate mixed lithium metal phosphate.

The milling stage is preferably carried out by a jet mill. For the purpose of the present invention any jet mill considered to be suitable by the skilled person can be used.

According to a still further preferred embodiment of the present method the fluidizing stage and the sifting stage and optionally the milling stage are separate stages. In this case, the fluidized powder can be conveyed by pneumatic conveying tubes and/or by gravity.

In a further preferred embodiment of the present method the fluidizing stage, the sifting stage and the optional milling stage are integrated in one device. For the purpose of the present invention any device including in combination a fluidizing stage and a sifting stage and optionally a milling stage considered to be suitable by the skilled person can be used.

For example, for carrying out the present method a jet mill of the type "Fluidized Bed Opposed Jet Mill AFG200" manufactured by Hosokawa Alpine AG, Augsburg, Germany can be used.

According to a further preferred embodiment of the present method the fluidizing stage, the sifting stage and the optional milling stage include rubber linings and/or ceramic parts for wear protection, in order to reduce the wear and therefore to lengthen the service life of the corresponding stages.

Advantageously, the fluidizing stage includes an automatic eject valve for removing the content of the fluidizing stage in step f).

The automatic eject valve serves to regularly remove the full content of the fluidizing stage in order to achieve the contaminant removing effect of the present method.

Furthermore, as the filling grade of the fluidized bed chamber may influence the efficiency of the sifting stage, control of the filling grade by means of weight control, control of power demand of the sifting stage or any other type of control suitable for this purpose is preferred.

In the following, the invention is explained in more detail, wherein the example and the figures are not meant to limit the scope of the invention.

EXAMPLE 5000 kg (mass x*m, wherein x=500) of a particulate lithium iron phosphate material obtained according to the method disclosed in US 2007/0054187 A1 as a particulate mixed lithium metal phosphate material were continuously treated according to the present method in a Fluidized Bed Opposed Jet Mill AFG200 (manufactured by Hosokawa Alpine AG, Augsburg, Germany). The jet mill was equipped with a wear-proof ceramic classifier wheel and with air injection nozzles and a product outlet tube also made of ceramics. The milling chamber and all other associated product conducting tubes were wear-protected by a Vulkollan rubber coating.

The milling parameters used were as follows:
Nozzle diameter: 5 mm
Air pressure: 2.5 bar
Pressure inside sifting stage: 1 atm (1013 hPa)
Rotation speed of classifying wheel: 7530 rpm
Filling level of fluidized bed chamber: 10 kg (i.e. mass m)

The treatment was started by continuously feeding the particulate lithium iron phosphate material into the jet mill. After 500 kg (50 times of the mass m) of the particulate lithium iron phosphate material have been fed into the jet mill, the process was continued without feeding further particulate lithium iron phosphate material into to the jet mill until the content of the fluidized bed chamber was reduced to 5 kg (50% of the mass m). After that the jet mill was opened and the 5 kg residual powder were completely removed from the fluidized bed chamber and discarded. The same procedure, i.e. treatment of 500 kg, respectively, is repeated for the remaining 4500 kg of fine particulate lithium iron phosphate.

A 500 g sample of the final product was tested for magnetic particle contamination according to the following test method:

In a 2 liter cylindrical plastic bottle, 500 g of the sample material were dispersed in 1000 ml distilled water together with one ball magnet having a diameter of 12.7 mm (material: NdFeB N35, surface: Ni—Cu—Ni, magnetic flux density: 11700 to 12100 Gauss). The ball magnet is separated from the slurry without touching the magnetic pole regions, rinsed with distilled water and cleaned in an ultrasonic bath, wherein the water flow is directed such that the magnetic material adherent to the magnet is concentrated on the poles, where the magnetic flux density has a maximum value. After that the ball magnet is dried in a laboratory oven at a temperature below 90° C. Both poles are pressed on a SEM sample holder provided with a glued conductive film in order to transfer the magnetic particles onto the sample holder for an SEM analysis. The analysis is performed in the BSE detector mode in order to be able to discriminate between magnetic metallic or oxidic particles (bright white to bright grey BSE contrast) and adherent lithium iron phosphate particles (dark grey BSE contrast).

Figure 1A:
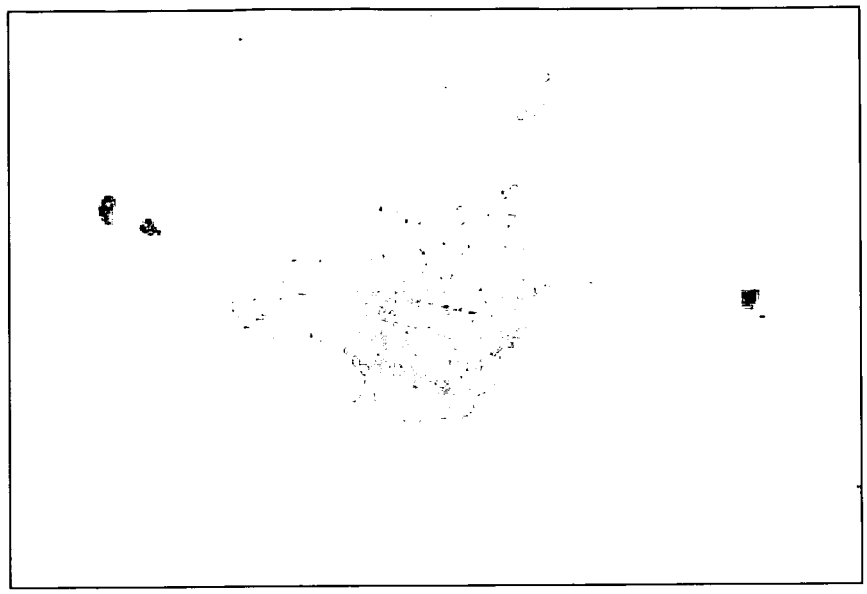
FIG. 1A shows an SEM/BSE (BSE=back scattered electron imaging) image of a sample of the final product obtained in the example.

FIG. 1A shows a SEM/BSE image of a sample of said final product. The dark grey particles in the center of the image are fine particulate lithium iron phosphate product particles adhering to a ball magnet used in the test method despite the washing procedure, since lithium iron phosphate is a strong paramagnetic material. The SEM/BSE image shows only a few bright particles indicating a very small contamination by metallic or mainly oxidic magnetic particles.

The quantitative analysis of the sample shows that the final product includes a very low amount of less than 0.02 ppm of particulate contaminant material, predominantly consisting of ferrous oxide $Fe_3O_4$.

Furthermore, a second sample of 500 g of the last 5 kg residue removed from the fluidized bed chamber at the end of the complete 5000 kg milling treatment were tested for magnetic particle contamination according to the same test method.

Figure 1B:
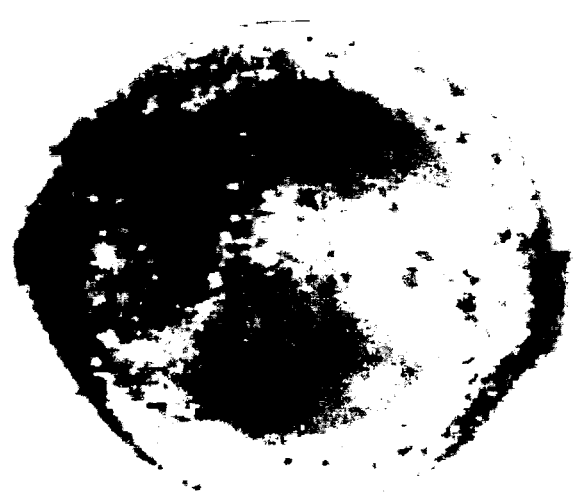
FIG. 1B shows an SEM/BSE image of a sample of the fluidized bed residue obtained in the example.

FIG. 1B shows a SEM/BSE image of the second sample, wherein the ball magnet carried a considerable amount of magnetic particles (<10 ppm % by weight of particulate contaminant material (predominantly Fe—Cr—Ni stainless steel and ferrous oxide $Fe_3O_4$). This demonstrates that there was a considerable amount of magnetic contaminant particles in the fluidized bed chamber, but respective particles were rejected by the sifting stage, because the intermittent removal of the mill residue considerably reduced the level of accumulation of particulate contaminant materials.

The above test shows that the present method provides a fine particulate lithium iron phosphate product including a very low amount of particulate contamination materials with a loss of approximately only 1% of the product treated by the present method.

Comparative Example 5000 kg of fine particulate lithium iron phosphate obtained according to the method disclosed in US 2007/0054187 A1 as a particulate mixed lithium metal phosphate material were continuously treated with the same jet mill and the same milling parameters as in the example, except that the jet mill was not stopped and its fluidized bed chamber was not emptied during milling of the complete 5000 kg of particulate lithium iron phosphate material.

500 g of the final product passed through the jet mill at the end of the complete 5000 kg milling treatment were tested for magnetic particle contamination according to the test method described above.

Figure 2A:
FIG. 2A shows an SEM/BSE image of a sample of the final product obtained in the comparative example.

FIG. 2A shows a SEM/BSE image of a sample of said final product. The dark grey particles are again fine particulate lithium iron phosphate product particles. However, there is a large quantity of bright particles visible in the SEM/BSE image indicating a high contamination by metallic or oxidic magnetic particles. FIG. 2A also shows that some of these particulate contaminant materials are extremely large (more than 50 pm) and therefore much larger than the typical cut-off size of the sifting stage. Therefore, due to the small but still considerable probability of large metallic or oxidic particles to pass the sifting stage in combination with an accumulation thereof and hence a high percentage of such particles in the fluidized powder bed, many contaminant particles could remain in the final product.

Furthermore, 500 g of the last 5 kg residue removed from the fluidized bed chamber at the end of the complete 5000 kg milling treatment were tested for magnetic particle contamination according to the same test method.

Figure 2B:
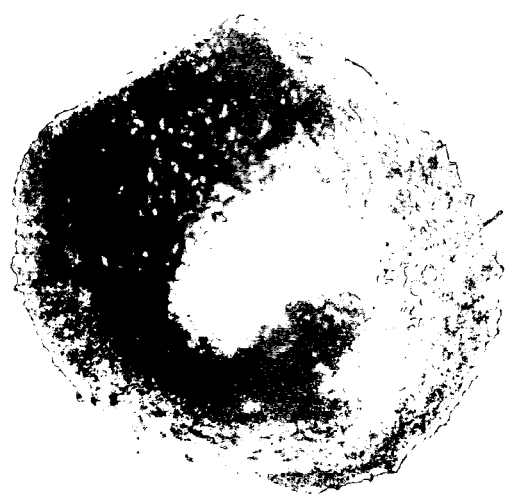
FIG. 2B shows a SEM/BSE image of a sample of the fluidized bed residue obtained in the comparative example.

FIG. 2B shows a SEM/BSE image of a sample of said residue, wherein the ball magnet carried a very large amount of magnetic particles. This demonstrates that there was a strong accumulation of magnetic particles in the fluidized bed chamber promoting passage of particulate contaminant materials through the sifting stage without having been intermittently removed with the mill residues.

The above test shows that the present method provides a particulate lithium iron phosphate product including a very low amount of particulate contaminant materials with a loss of approximately only 1% of the starting product, treated by the present method.

The invention claimed is:

1. A method for removing a particulate contaminant material from a particulate mixed lithium metal phosphate material, comprising the steps of:
    a) providing a particulate mixed lithium metal phosphate material, including a particulate contaminant material and a fine particulate mixed lithium metal phosphate, having a mass,
    b) feeding the particulate mixed lithium metal phosphate material into a fluidizing stage and fluidizing it in the fluidizing stage, wherein the fluidized material in the fluidized stage has an average mass,
    c) feeding the fluidized particulate mixed lithium metal phosphate material to a sifting stage and passing it through the sifting stage,
    d) discontinuing the feed of the particulate mixed lithium metal phosphate material into the fluidizing stage after 10 to 100 times of mass m have been fed into the fluidizing stage,
    e) fluidizing and sifting the material present in the fluidizing stage after discontinuing the feed, until the mass of the material present in the fluidizing stage becomes 10% to 100% of the mass m, and
    f) removing the remaining material from the fluidizing stage, wherein
    the mass of the particulate mixed lithium metal phosphate material provided in step a) is equal to x·m, in which x>100 and
    the sequence of steps b) to f) is repeated until the total mass x·m has been processed.

2. The method according to claim 1, wherein the feed of the particulate mixed lithium metal phosphate material into the fluidizing stage is discontinued after 30 to 70 times of the mass m have been fed into the fluidizing stage.

3. The method according to claim 1, wherein the material present in the fluidizing stage is fluidized and sifted after discontinuing the feed, until the mass of the material present in the fluidizing stage becomes 20% to 80% of the mass m.

4. The method according to claim 1, wherein the mixed lithium metal phosphate is represented by the formula $LiMPO_4$, wherein M is selected from at least one metal selected from the group consisting of Fe, Sc, Ti, V, Cr, Mn, Co, Ni, Cu, Zn, Be, Mg, Ca, Sr, Ba, Al, Zr, La, and rare earth metals.

5. The method according to claim 4, wherein M is selected from the group consisting of Fe, Mn, Co and Ni and mixtures thereof.

6. The method according to claim 5, wherein M is Fe.

7. The method according to claim 1, wherein the fine particulate mixed lithium metal phosphate consists of particles having a $D_{90}$ value of at most 25 μm.

8. The method according to claim 7, wherein the fine particulate mixed lithium metal phosphate particles have a $D_{90}$ value of less than 0.8 μm.

9. The method according to claim 1, wherein the particulate contaminant material is a metallic and/or oxide material.

10. The method according to claim 1, wherein the fluidizing stage is a fluidized bed chamber.

11. The method according to claim 1, wherein the method additionally comprises a step b1) of milling the particulate mixed lithium metal phosphate material in a milling step between the steps a) and b) or between b) and c).

12. The method according to claim 11, wherein the milling step is carried out with a jet mill.

13. The method according to claim 11, wherein the milling step is carried out in a milling stage and the fluidizing stage, the sifting stage and the milling stage are separate stages.

14. The method according to claim 13, wherein the fluidizing stage, the sifting stage and the milling stage are integrated in one device.

15. The method according to claim 1, wherein the fluidizing stage includes an automatic eject valve for removing the content of the fluidizing stage in step f).

* * * * *